United States Patent [19]
Niedecker

[11] 3,951,262
[45] Apr. 20, 1976

[54] ASSEMBLY OF LOOPS FOR SUSPENDING SAUSAGES

[76] Inventor: Herbert Niedecker, Am Ellerhang 6, 6243 Falkenstein (Taunus), Germany

[22] Filed: Sept. 30, 1974

[21] Appl. No.: 510,834

[30] Foreign Application Priority Data
Oct. 17, 1973 Germany............................ 2352000

[52] U.S. Cl.................................... 206/343; 17/35; 17/44.2; 224/58
[51] Int. Cl.²..................... A22C 11/02; B65D 85/00
[58] Field of Search....................... 17/44, 44.2, 44.3; 224/7 E, 58; 206/338, 343–346, 478–479, 526–527

[56] References Cited
UNITED STATES PATENTS

| | | | |
|---|---|---|---|
| 697,503 | 4/1902 | Lindsay............................ | 206/338 X |
| 961,869 | 6/1910 | Lindenberger....................... | 17/44.3 |
| 1,865,112 | 6/1932 | Kelley................................. | 206/338 |
| 2,407,172 | 9/1946 | McMillan............................. | 224/58 |

*Primary Examiner*—William Price
*Assistant Examiner*—Steven E. Lipman
*Attorney, Agent, or Firm*—Burgess, Dinklage & Sprung

[57] ABSTRACT

An assembly of individual, individually closed loops for suspending sausages, which loops are adapted to be automatically supplied to automatic sausage-sealing machines, comprising a belt, a plurality of loops, and means connecting each of said loops to said belt with portions of each loop projecting on both sides of the belt. The belt may comprise two strips secured to one another with adhesive, the loops being thereby locked between the strips. The belt may also be provided with regularly spaced indexing elements whereby it can be advanced at controlled predetermined speed for supplying said loops.

6 Claims, 2 Drawing Figures

ASSEMBLY OF LOOPS FOR SUSPENDING SAUSAGES

This invention relates to an assembly of individual, individually closed loops for suspending sausages, which loops are adapted to be supplied by a machine to an automatic sausage-sealing machine, particularly to such a machine in which sealing clips are used.

Loops for suspending sausages to be sealed by means of clips have previously been made as finished loops and have been individually inserted into the inserting device, into a part of the sealing machine or into the sealing clip. That practice has the disadvantage that a person must grasp each loop and must prepare it for being inserted. Where high-speed automatic sealing machines are employed, this requirement involves special difficulties and a considerable risk of accidents.

To avoid the need for expensive manual work in the manufacture of sausages it has already been proposed to form suspending loops from a sausage yarn which forms two lines, which extend one beside the other and are connected to form spaced apart loops (German Utility Model 1,739,913). That sausage yarn has the disadvantage that it does not form discrete, individually closed loops but one loop length must be severed for a sealing of each sausage end so that both lines then have necessarily free ends. In the known practice, the free ends of the lines must be wound around the end of the sausage and must be tied together. In connection with a sausage-sealing apparatus in which sealing clips are used, this manipulation cannot be carried out because it is too slow and too expensive and involves an excessive risk of trouble.

It has also been proposed to close bags by means of U-shaped wire elements having very long legs (French Pat. No. 1,154,851). These wire elements do not form individually closed loops such as are required in the present case. In connection with the previously known U-shaped wire elements it has also been proposed to bundle said elements for storage or transportation in such a manner that all elements have the same orientation. The wire elements thus bundled cannot be supplied by a machine to an automatic sealing machine because when the fastener of the bundle has been opened the U-shaped wire elements are not available in such an ordered arrangement that they can be individually gripped and supplied by a machine to the sealing machine.

It is an object of the invention to provide an assembly of loops for suspending sausages, which loops can be supplied by a machine to an automatic sausage-sealing machine and which can be supplied to the inserting station in a quick and trouble-free manner and without risk to the operator.

This object is accomplished according to the invention in that the approximately parallel sides of the laterally spaced loops for suspending sausages are secured to a belt in such a manner that open loop portions protrude from both sides of the belt.

The teaching of the invention to secure a plurality of loops for suspending sausages to a belt results in the advantage that the loops can be wound on a bobbin and can be supplied by a machine from said bobbin to the inserting station. As a result, the automatic sealing machine can be operated at a higher speed than in case of a manual insertion of the loops, and a source of accident is eliminated at the same time.

The loops for suspending sausages are suitably secured to the belt in such a manner that one open loop portion can well be gripped by the clip whereas the other open loop portion is easily accessible by the means from which the sausages are to be suspended. As a result, the suspending of the sausages is greatly facilitated as soon as one loop and the belt portion associated with it have been cut off in the sealing machine and the loop has been secured to the sausage when the sealing clip has been closed.

The loops are preferably secured to the belt by means of two strips of paper, plastics material or textile fabric, which strips are adhesively joined to each other so that the loops are secured between said strips, which form the belt. Alternatively, the loops may be adhesively joined or secured in a different manner to only one belt. The belt may be coloured or printed for an identification of the kind of sausage. Two parallel belts may be used for handling particularly large loops.

The belt is suitably provided with holes or edge recesses so that drive means, such as an advancing means, a feeding wheel or a feeding drum provided with drivers, can be used to supply the belt to the inserting station. The movement of the belt to the sealing station is controlled in synchronism with the operation of the sealing machine. To facilitate the withdrawal of the loops from the bobbin, a liner of paper or plastics material may be provided between adjacent layers of loops.

To manufacture the assembly, the loops for suspending sausages are fed to the belt by a machine, e.g., by an automatic loop-tying machine where tied loops are used.

The invention is illustrated in the drawings.

Figure 1:
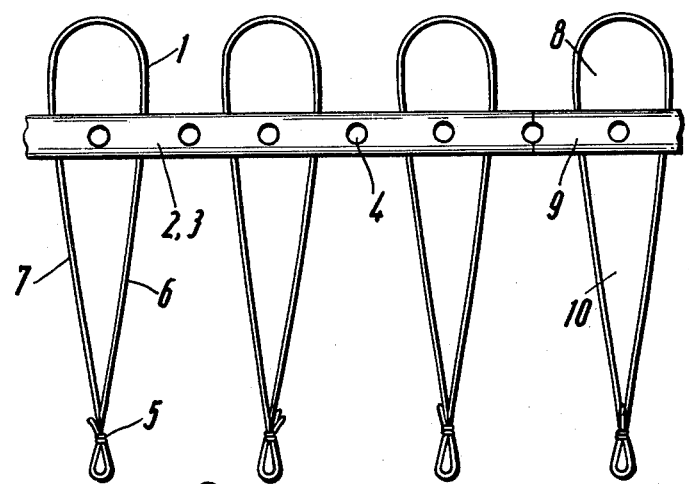
FIG. 1 is a top plan view showing a belt.

According to FIG. 1, the loop 1 for suspending sausages is held between strips 2, 3 of paper or plastics material in such a manner that the approximately parallel sides 6, 7 of each loop are sufficiently spaced apart so that loop portions 8, 10 are formed above and below the belt. The strips are formed with holes 4 having a predetermined pitch. A tied loop is shown, which has a knot 5. As the belt is supplied to the inserting station of a sealing machine (not shown), the upper loop portion 8 is laid into a sealing clip (not shown). When the loop has been separated from the belt, the cut-off portion 9 keeps the sides of the loops apart so that a rod from which the sausages are to be suspended can easily be introduced into the lower loop portion 10.

Figure 2:
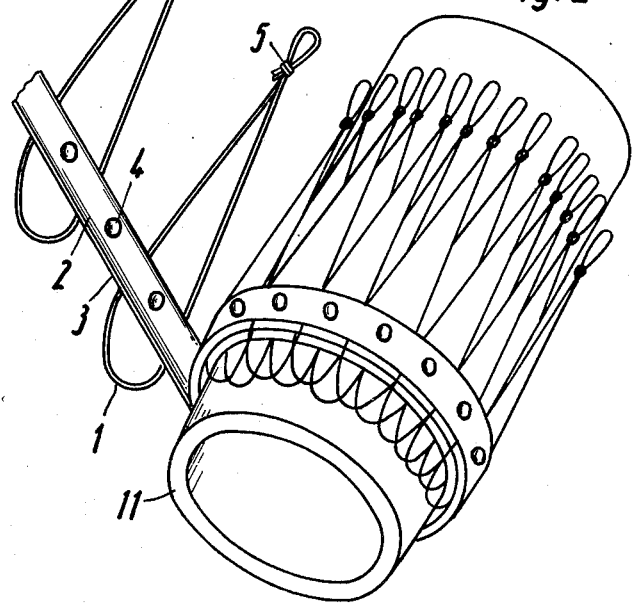
FIG. 2 is a perspective view showing a bobbin and a belt wound thereon.

FIG. 2 shows the belt which is wound on a bobbin 11 and on which the loops can easily be supplied to the sealing machine.

It will be appreciated that the instant specification and examples are set forth by way of illustration and not limitation, and that various modifications and changes may be made without departing from the spirit and scope of the present invention.

What is claimed is:

1. An assembly of individual, individually closed loops for suspending sausages, which loops are adapted to be automatically supplied to automatic sausage-sealing machines, comprising a belt, a plurality of loops, and means securing each of said loops to said belt with predetermined fixed portions of each loop projecting on both sides of the belt.

2. An assembly according to claim 1 wherein said securing means comprises adhesive on said belt.

3. An assembly according to claim 1 wherein said belt is provided with regularly spaced indexing means whereby it can be advanced at controlled predetermined speed for supplying said loops.

4. An assembly according to claim 1 wherein said belt comprises two strips, one on either side of said plurality of loops.

5. An assembly according to claim 4 wherein said securing means comprises adhesive joining the two strips of said belt, said belt being provided with regularly spaced indexing means whereby it can be advanced at controlled predetermined speed for supplying said loops.

6. An assembly according to claim 5 wherein said indexing means comprises regularly spaced holes in said belt.

* * * * *